(12) United States Patent  (10) Patent No.: US 9,250,510 B2
Li et al.  (45) Date of Patent: Feb. 2, 2016

(54) PANORAMIC STEREO CATADIOPTRIC IMAGING

(75) Inventors: Weiming Li, New Territories (HK); Youfu Li, New Territories (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 993 days.

(21) Appl. No.: 13/397,636

(22) Filed: Feb. 15, 2012

(65) Prior Publication Data

US 2013/0208083 A1  Aug. 15, 2013

(51) Int. Cl.
| | |
|---|---|
| *H04N 13/02* | (2006.01) |
| *G03B 37/06* | (2006.01) |
| *G03B 35/00* | (2006.01) |
| *G02B 13/06* | (2006.01) |
| *H04N 5/232* | (2006.01) |

(52) U.S. Cl.
CPC ............. *G03B 37/06* (2013.01); *G02B 13/06* (2013.01); *G03B 35/00* (2013.01); *H04N 5/23238* (2013.01); *H04N 13/0207* (2013.01); *H04N 13/026* (2013.01); *H04N 13/0217* (2013.01)

(58) Field of Classification Search
CPC ........ G02B 13/06; G02B 35/00; G02B 37/06; H04N 13/0207; H04N 13/0217; H04N 13/026; H04N 5/23238
USPC .......................................................... 348/36
See application file for complete search history.

(56) References Cited

U.S. PATENT DOCUMENTS

| | | | |
|---|---|---|---|
| 3,505,465 A | 4/1970 | Rees | |
| 4,858,013 A * | 8/1989 | Matsuda | 348/247 |
| 5,023,725 A * | 6/1991 | McCutchen | 348/38 |
| 5,815,159 A * | 9/1998 | Katayama et al. | 345/600 |
| 6,157,018 A | 12/2000 | Ishiguro | |
| 6,738,569 B1 | 5/2004 | Sogabe | |
| 6,809,887 B1 * | 10/2004 | Gao et al. | 359/725 |
| 7,420,750 B2 | 9/2008 | Kuthirummal | |
| 7,499,644 B2 | 3/2009 | Franke et al. | |
| 2001/0040671 A1 * | 11/2001 | Metcalf | 353/94 |
| 2002/0141636 A1 * | 10/2002 | Wakamoto et al. | 382/154 |
| 2004/0027451 A1 * | 2/2004 | Baker | 348/46 |
| 2006/0008119 A1 * | 1/2006 | Chang et al. | 382/103 |
| 2006/0023105 A1 * | 2/2006 | Kostrzewski et al. | 348/335 |
| 2006/0109202 A1 * | 5/2006 | Alden | 345/32 |
| 2006/0209019 A1 * | 9/2006 | Hu | 345/156 |
| 2006/0284971 A1 * | 12/2006 | Wren et al. | 348/36 |
| 2007/0024701 A1 * | 2/2007 | Prechtl et al. | 348/47 |

(Continued)

OTHER PUBLICATIONS

Mezouar et al, Robustness of Central Catadioptric Image-Based Visual Servoing to Uncertainties on 3D Parameters, Oct. 2, 2004.*

(Continued)

*Primary Examiner* — Shan Elahi
(74) *Attorney, Agent, or Firm* — Amin, Turocy & Watson, LLP

(57) ABSTRACT

The disclosed subject matter relates to providing panoramic stereo vision captured with a single camera scheme employing a catadioptric optical path. In an aspect the presently disclosed subject matter can capture a stereo image over a full 360-degree horizontal field of view or portions thereof. Further, the vertical FOV is enlarged compared to conventional cata-fisheye schemes. A system according to the instant subject matter can be calibrated with a computational model that can accommodate a non-single viewpoint imaging model to conduct 3D reconstruction in Euclidean space.

24 Claims, 15 Drawing Sheets

(56) References Cited

U.S. PATENT DOCUMENTS

| | | | | |
|---|---|---|---|---|
| 2007/0035707 | A1* | 2/2007 | Margulis | 353/122 |
| 2008/0166011 | A1* | 7/2008 | Sever et al. | 382/100 |
| 2008/0246759 | A1* | 10/2008 | Summers | 345/420 |
| 2008/0291318 | A1* | 11/2008 | Artonne et al. | 348/340 |
| 2008/0298674 | A1* | 12/2008 | Baker et al. | 382/154 |
| 2009/0034086 | A1* | 2/2009 | Montgomery et al. | 359/629 |
| 2009/0128902 | A1* | 5/2009 | Niv et al. | 359/482 |
| 2010/0195007 | A1* | 8/2010 | Takahashi | 349/16 |
| 2011/0018964 | A1 | 1/2011 | Krishnan et al. | |
| 2011/0096136 | A1* | 4/2011 | Liu et al. | 348/14.07 |
| 2011/0181689 | A1* | 7/2011 | Kweon | 348/37 |
| 2011/0261993 | A1* | 10/2011 | Weiming et al. | 382/100 |
| 2012/0250977 | A1* | 10/2012 | Agrawal et al. | 382/154 |
| 2013/0063573 | A1* | 3/2013 | Erinjippurath | 348/51 |

OTHER PUBLICATIONS

Li et al, Single-camera panoramic stereo imaging system with a fisheye lens and a convex mirror, Mar. 28, 2011.*

Kim, et al., "SLAM with omni-directional stereo vision sensor,"in Proceedings of IEEE International Conference on Intelligent Robots and Systems (Institute of Electrical and Electronics Engineers, New York, 2003), pp. 442-447, 6 pages.

Koyasu, et al., "Mobile robot navigation in dynamic environments using omnidirectional stereo," in Proceedings of IEEE International Conference on Robotics and Automation (Institute of Electrical and Electronics Engineers, New York, 2003), pp. 893-898, 6 pages.

Zhu, et al., "Adaptive Panoramic Stereo Vision for Human Tracking and Localization with Cooperative Robots", http://130.203.133.150/viewdoc/versions;jsessionid=2395C366D82CBDD391AF602FC8DA0ADB?doi=10.1.1.94.3950&version=0, 20 pages, 2004.

F. B. Valenzuela, and M. T. Torriti, "Comparison of panoramic stereoscopic sensors based on hyperboloidal mirrors", in Proceedings of the 6th Latin American Robotics Symposium, (Institute of Electrical and Electronics Engineers, New York, 2009), pp. 1-8.

E. L. L. Cabral, J. C. S. Junior, and M. C. Hunold, "Omnidirectional stereo vision with a hyperbolic double lobed mirror," in Proceedings of International Conference on Pattern Recognition, J. Kittler, M. Petrou, and M. Nixon, ed. (IEEE Computer Society, Los Alamitos, Calif., 2004), pp. 1-93.

G. Jang, S. Kim, and I. Kweon, "Single-camera panoramic stereo system with single-viewpoint optics," Opt. Lett. 31(1), 41-43 (2006).

Su, et al., "Obtaining obstacle information by an omnidirectional stereo vision system," Int. J. Robot. Autom. 24, 222-227 (2009), 7 pages.

Caron, et al., "3D model based pose estimation for omnidirectional stereovision," in Proceedings of IEEE International Conference on Intelligent Robots and Systems (Institute of Electrical and Electronics Engineers, New York, 2009), pp. 5228-5233, 6 pages.

Yi, et al., "An omnidirectional stereo vision system using a single camera," in Proceedings of International Conference on Pattern Recognition, Y.Y. Tang, S.P. Wang, G. Lorette, D.S. Yeung, and H. Yan, ed. (IEEE Computer Society, Los Alamitos, Calif., 2006), pp. 861-865, 6 pages.

Tan, et al., "Multiview panoramic cameras using mirror pyramids," IEEE Trans. Pattern Anal. Mach. Intell. 26(7), 941-946 (2004), 6 pages.

Krishnan, et al., "Cata-fisheye camera for panoramic imaging," in Proceedings of IEEE Workshop on Application of Computer Vision (Institute of Electrical and Electronics Engineers, New York, 2008), pp. 1-8, 8 pages.

Baker, et al., "A theory of single-viewpoint catadioptric image formation," Int. J. Comput. Vis. 35(2), 175-196 (1999, 50 pages.

Tardif, et al., "Calibration of cameras with radially symmetric distortion," IEEE Trans. Pattern Anal. Mach. Intell. 31 (9), 1552-1566 (2009), 14 pages.

Swaminathan, et al., "Non-Single Viewpoint Catadioptric Cameras: Geometry and Analysis," Int. J. Comput. Vis. 66 (3), 211-229 (2006), 39 pages.

Zhang, "A flexible new technique for camera calibration," IEEE Trans. Pattern Anal. Mach. Intell. 22(11), 1330-1334 (2000), 22 page.

ACCOWLE. Vision, http://www.accowle.com/english/ Last accessed Jan. 2, 2012, 1 page.

Hirschmuller, et al.,"Real-time correlation-based stereo vision with reduced border errors," Int. J. Comput. Vis. 47 (1/3), 229-246 (2002).

Li, et al., "Accurate calibration method for a structured light system," Opt. Eng. 47(5), 053604 (2008).

Geyer, et al., "Catadioptric projective geometry, International Journal of Computer Vision," vol. 45, No. 3, pp. 223-243, 2001, 21 pages.

Ishiguro, Development of low cost compact omni-directional vision sensors and their applications, In: Benosman, R., Kang, S.B. (eds.) Panoramic Vision: Sensors, Theory, and Applications. pp. 2-38. Springer, Heidelberg (2001), 7 pages.

* cited by examiner

PANORAMIC STEREO CATADIOPTRIC IMAGING

TECHNICAL FIELD

The various embodiments of the subject disclosure relates generally to catadioptric imaging, and more particularly to panoramic stereo catadioptric imaging.

BACKGROUND

Panoramic images can, generally, be captured by employing systems that are classified as either dioptric systems, those that do not use reflective optics, or catadioptric systems that use both reflective and refractive optics. Dioptric systems include conventional cameras that employ wide-angle or fisheye lens based systems. Catadioptric systems generally include those employing conventional cameras with reflective optical elements in addition to refractive lens elements.

Conventional technologies can use a plurality of cameras to capture visual segments of a panoramic image and thereafter "stitch" the images together to form a more full panoramic image. These stitching systems thus cannot share a single viewpoint and the images will encounter parallax issues, which can be terms the single viewpoint (SVP) problem. The use of a single camera can be regarded as co-location of the viewpoints of multiple cameras which can overcome the parallax problem associated with multiple cameras.

The use of a wide-angle lens or fisheye lens can capture a panoramic image from a single camera. However, the use of a fisheye lens results in the capture of hemispherical panoramic images as would be expected when using a hemispherical field of view (FOV) lens. Alternatively, the use of a catadioptric system can overcome the SVP by capturing the panorama with a single camera aligned with a convex mirror. However, the use of a catadioptric system can be complicated by non-linear vertical resolution in the image resulting from the image being captured off of a highly curved reflective surface. Employing a conical reflective surface can improve vertical resolution uniformity at the cost of vertical field of view because the conical reflective surface acts as a radially symmetric planar mirror.

Cata-fisheye schemes have been employed to capture panoramic images. In a cata-fisheye scheme, the FOV of the fisheye lens and the FOV of the catadioptric element can overlap. This overlap region can employ shallow mirrors to capture high quality panoramic images. Further, wherein the overlapping region captures two viewpoints that are very close together, parallax is negligible and the SVP is effectively circumvented.

Generally, conventional panoramic imaging systems aim at obtaining visual information from a wide FOV. It is further typically desirable to have stereo views that enable 3D depth perception. These features can be important for a variety of real-world applications such as surveillance and autonomous navigation mission environments. A number of conventional panoramic stereo vision systems have been proposed in the literature. One category of conventional systems uses two or more omni-directional cameras, which are configured to produce either horizontal stereo image pairs or vertical stereo image pairs. Another category of conventional systems uses only one single camera combined with typically complex optics to achieve stereo vision. The various optical components of these types of conventional systems have been reported to include, for example, a hyperbolic double lobed mirror, multiple combined conic mirrors, four parabolic mirrors (with an orthographic camera), a concave lens with a convex mirror, a mirror pyramid, etc. The implementations with multiple omni-directional cameras bring various burdens, such as, data acquisition with multi-camera synchronization, lack of a compact system size, higher system costs due to the complex optical elements, etc.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can include a system that facilitates panoramic stereo catadioptric imaging. The system can include a sensor component that detects energy impinges on the sensor component. The system can further include a processor component that can determine spatial information for the detected energy. The energy can be caused to imping the sensor plane by a refractive element and a reflective element.

In another embodiment, the disclosed subject matter can be in the form of a method. The method can include receiving scene information comprising at least a portion of a field of view of a refractive element and a portion of a field of view of a reflective element. The method can further comprise determining a first set of image information, for a point of the scene, related to the field of view of the refractive element and determining a second set of image information, for the point of the scene, related to the field of view of the reflective element. The method can then determining 3-dimensional spatial information for the point of the scene based on the first set of image information and the second set of image information.

In a further embodiment, the disclosed subject matter can be in the form of computer-executable instructions stored on a computer-readable storage medium. The computer-executable instructions can include receiving scene image information comprising refractive element image information and reflective element image information of a scene. The computer-executable instructions can also include determining a first set of image information, for a point of the scene, related to the refractive element image information and determining a second set of image information, for the point of the scene, related to the reflective element image information. The computer-executable instructions can then include determining 3-dimensional spatial information for the point of the scene based on the first set of image information and the second set of image information.

In an additional embodiment, the disclosed subject matter can be a system having a means for means for detecting energy impinging on a plane. The system can further have a means for determining 3-dimensional spatial information relating to the energy detected by the means for detecting energy. Moreover, the system can have means for refracting some of the energy to impinge on the means for detecting energy and a means for reflecting some of the energy to impinge on the means for detecting energy.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

DETAILED DESCRIPTION

Figure 1:
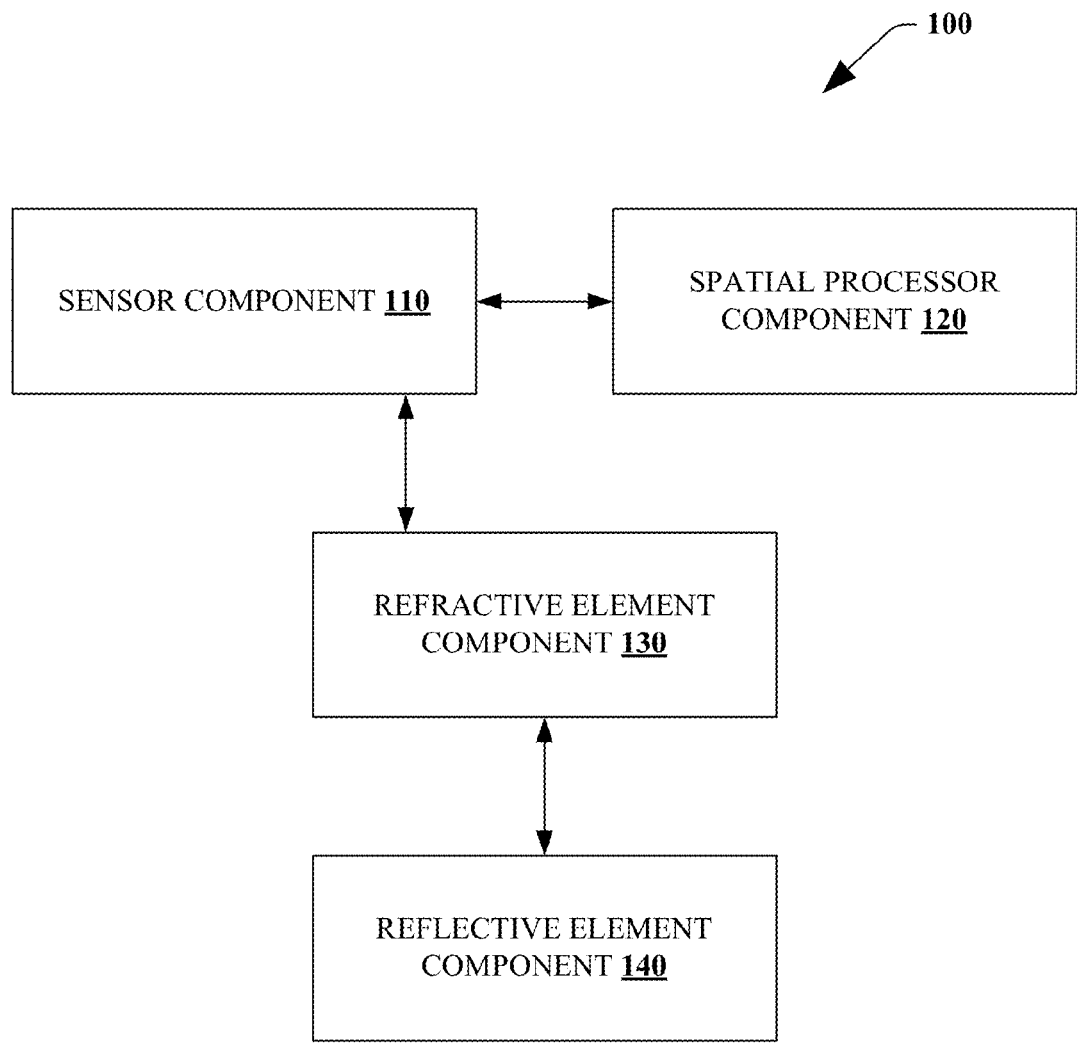
FIG. 1 is a diagram of a system that can facilitate panoramic stereo catadioptric imaging in accordance with an aspect of the subject matter disclosed herein.

The presently disclosed subject matter provides for panoramic stereo vision captured with a single camera scheme employing a catadioptric optical path. In an aspect the presently disclosed subject matter can capture a stereo image over a full 360-degree horizontal field of view or portions thereof. Further, the vertical FOV is enlarged compared to conventional cata-fisheye schemes. A system according to the instant subject matter can be calibrated with a computational model that can accommodate a non-single viewpoint imaging model to conduct 3D reconstruction in Euclidean space.

Compared to existing systems, the presently disclosed subject matter can simultaneously enhance the capability of image acquisition in two aspects. First, stereo vision can be enabled up to a 360 degree horizontal FOV. The vertical FOV for stereo vision can be centered near the horizontal plane, around which 3D information can be considered most valuable for deployed systems. As one non-limiting example, surface vehicles or robots that need to avoid obstacles on the ground and perform path planning can employ panoramic stereo vision captured with a single camera scheme employing a catadioptric optical path. Second, in addition to the stereo FOV, the presently disclosed subject matter can provide for enlargement of the vertical FOV over conventional systems. This can reduce or eliminate the visual blindness region associated with more conventional catadioptric systems and can provide for better monitoring of the surrounding environment in practical applications.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Turning to the figures, FIG. 1 illustrates a system 100 that can facilitate panoramic stereo catadioptric imaging in accordance with an aspect of the subject matter disclosed herein. System 100 can include sensor component 110. Sensor component 110 can be any sensor capable of detecting energy that can be interpreted as at least a part of an image. As non-limiting examples, optical sensor component 110 can include a charge-coupled device (CCD) sensor, complementary metal-oxide-semiconductor (CMOS) sensor, focal plane arrays (FPAs) that respond to longer wavelengths (mid- and long-wavelength infrared), microbolometers, radiometer, scintillation camera, etc. As a more specific non-limiting example, a CCD sensor can be part of a digital video camera that can be employed to capture an image for analysis in accordance with the presently disclosed subject matter. As an additional more specific non-limiting example, an infrared (IR) sensor in an forward looking infrared (FLIR) camera that can be employed to capture an image for analysis in accordance with the presently disclosed subject matter.

It will be noted that nearly any type of optical sensor that can resolve a plurality of pixels comprising at least a portion of an image can be employed in the presently disclosed subject matter and that all such sensors are considered within the present scope. It will be further noted, that for clarity and brevity, the remainder of this disclosure will generally be disclosed in terms of optical systems, though it is explicitly not so strictly limited. As such, the discussion regarding optical energy and components can be substituted with corresponding discussion and components related to the portion of the energy spectrum being detected by sensor component 110 for spatial analysis. For example, where an IR sensor is being employed, the corresponding components of system 100 would operate in IR energy bands to provide for IR panoramic stereo catadioptric imaging. Similarly for example, where a UV sensor is being employed the corresponding components of system 100 would operate in UV energy bands to provide for UV panoramic stereo catadioptric imaging.

System 100 can further comprise spatial processor component 120. Spatial processor component 120 can be communicatively coupled with sensor component 110. Spatial processor component 120 can receive sensor data. In an aspect sensor data can be generated by sensor component 110. In an embodiment, spatial processor component 120 can process the sensor data to, at least in part, determine spatial information for elements of a scene imaged in part by sensor component 110. As one example, an optical sensor can generate data relating to an optical scene and this data can be received by spatial processor component 120, which can then determine spatial characteristics of the optical scene sensed by sensor component 110. Continuing the example, where the scene includes an object nearer to the sensor and an object farther from the sensor, spatial processor component 120 can determine information that can be informative as the one object being nearer and one object being farther away. In an aspect, this analysis can include determining separate focused images for the same region, for example, a first focused image of a portion of the scene relating to a refractive element and a second focused image of the same portion of the scene relating to a reflective element.

System 100, as such, can include a refractive element component 130 (refractive component 130) and reflective element component 140 (reflective component 140). Refractive component 130 can be oriented to refract at least a portion of the energy spectrum reflected by reflective component 140 to impinge on sensor component 110. In an exemplary optical system, refractive component 130 can be, for example an optical lens. In an embodiment, refractive component 130 can be a fisheye or wide-angle lens. Further, in an exemplary optical system, reflective component 140 can be a spherical convex mirror. In a non-limiting exemplary embodiment, a CCD camera (sensor component 110) can sense an optical image of a scene focused by a fisheye lens (refractive component 130) capturing at least part of the scene reflected by a rotationally symmetric mirror (reflective component 140). Continuing the example, a computer can receive the sensed image from the CCD camera and can determine a first focused image of the scene relating to the fisheye lens and a second focused image of the scene relating to the symmetric mirror. Analysis of the two images can facilitate a determination of the spatial proximity of objects of the scene, such as one object being closer to the CCD sensor than another object in the scene.

Figure 2:
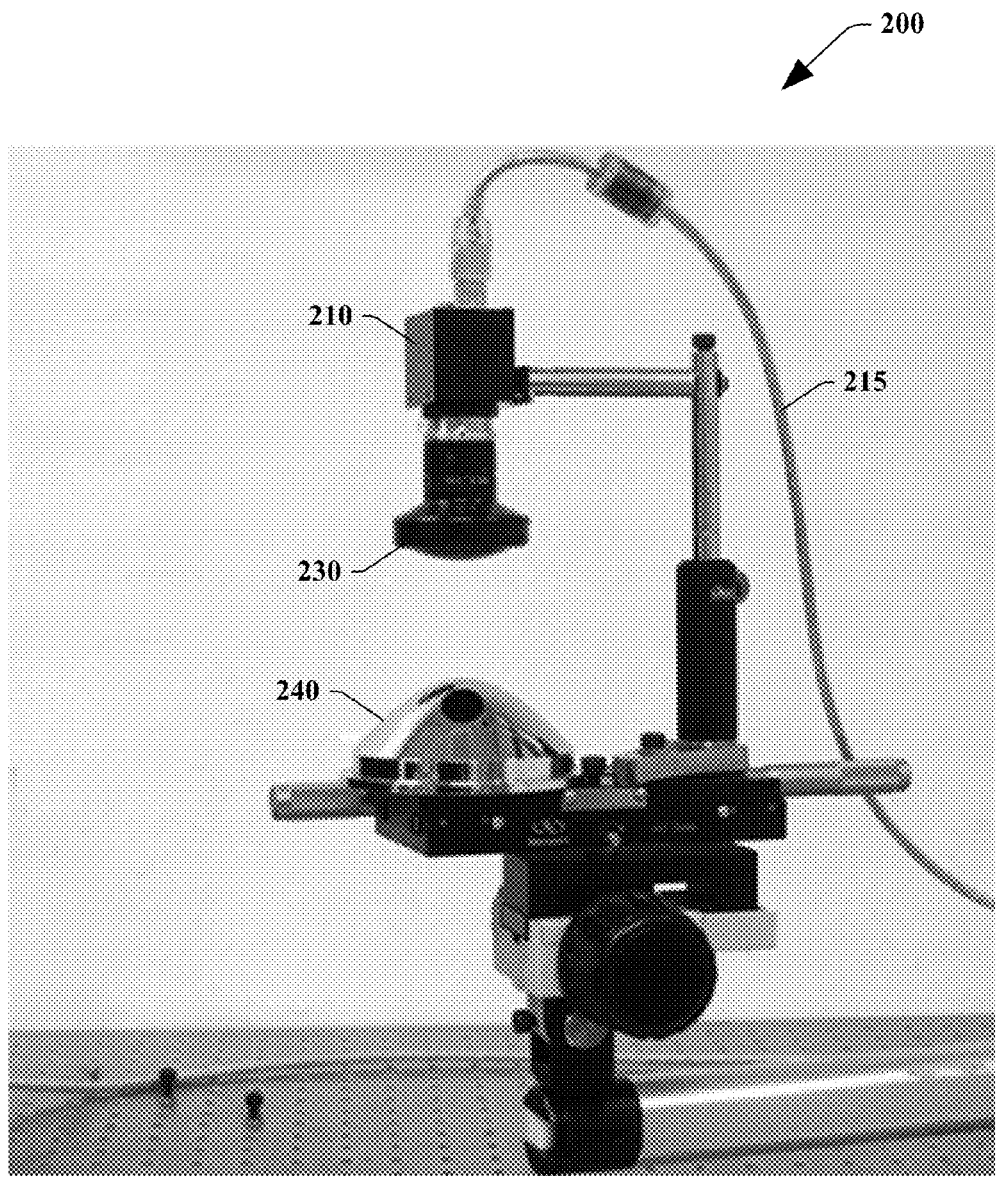
FIG. 2 illustrates an exemplary system that can facilitate panoramic stereo catadioptric imaging in accordance with an aspect of the disclosed subject matter.

FIG. 2 depicts an exemplary system 200 that can facilitate panoramic stereo catadioptric imaging in accordance with an aspect of the disclosed subject matter disclosed herein. System 200 can include an optical camera 210. The optical camera can detect optical energy relating to a scene. The detected optical energy can be communicated to a spatial analysis component (not illustrated) by way of communication cable 215. The illustrated example in system 200 can include a fisheye lens 230 on camera 210 and a convex reflective mirror 240 (mirror 240) oriented as shown in FIG. 2. The optical axis of fisheye lens 230 and the optical axis of mirror 240 can be rotationally aligned. As such, an image captured by system 200 can contain a fisheye image region and a catadioptric image region. Of note, these regions are captured through different optical paths. Energy relating to the image captured by the refractive path, e.g., by way of fisheye lens 230, directed to the sensor in camera 210 through the refraction of the fisheye lens. Energy relating to the image captured by the catadioptric path, e.g., the reflected and refracted energy, is first reflected by mirror 240 and then refracted through fisheye lens 230 onto the sensor of camera 210. Accordingly, a scene point in the overlapping FOV of the two image regions, the refractive image and the catadioptric image, generates a stereo image pair in the captured image, which can encode FOV depth information.

A theoretical analysis of system 200 geometry demonstrates that the design can be configured to balance a variety of performance requirements, including the stereo FOV, the entire FOV, the equivalent baseline for stereo vision, and the image resolution, among others. As such, adapting the parameters of the geometry can provide for design flexibility to meet application demands that may emphasize different performance aspects. In an aspect, model parameters can be estimated using a homography-based method. Of note, one possible homography-based method can comprise training with of a limited number of images of a planar source, such as an LCD panel, in unknown positions, as will be disclosed elsewhere herein.

It can be appreciated that stereo vision occurs where the refractive image and the catadioptric image capture the same scene. The geometry of a system such as system 200 can be adjusted to alter the amount of overlap of the refractive and catadioptric image of a scene. As such, the portion of a scene that can be analyzed for stereo vision information will correspondingly change. It will be noted that there can be no overlap, some overlap or complete overlap between the refractive image and the catadioptric image of a scene depending on system geometry and the particular characteristics of the several components comprising the system.

Figure 3:
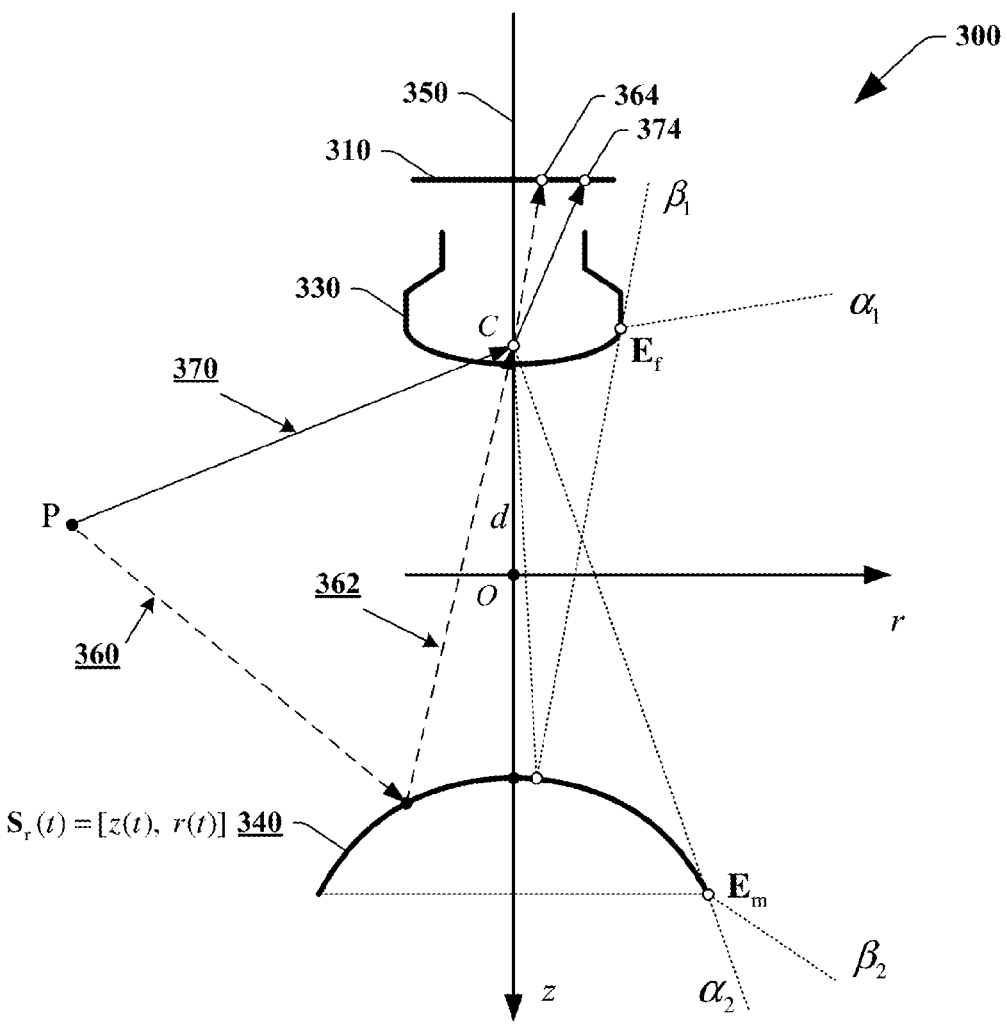
FIG. 3 is a diagram of a system that can facilitate panoramic stereo catadioptric imaging in accordance with an aspect of the disclosed subject matter.

Turning now to FIG. 3, presented is a diagram of a system 300 that can facilitate panoramic stereo catadioptric imaging in accordance with an aspect of the subject matter disclosed herein. System 300 can be a cross section diagram of a rotationally symmetric panoramic stereo catadioptric imaging system. System 300 can be illustrated as a 2D vertical cross section having a coordinate frame z-r defined where the z axis is aligned with the rotational axis.

The system impinges a scene on the image sensor plane 310 through both a fisheye lens 330, from vertical view angle $\alpha_1$ to $\alpha_2$, and the reflection of a convex mirror 340, from vertical view angle $\beta_1$ to $\beta_2$. Wherein all the view angles are discussed in the vertical cross section, we omitted the term 'vertical' before them for a clarity and brevity. The combined FOV of the refractive and catadioptric portions of system 300, is from $\beta_1$ to $\alpha_2$. Within the combined FOV, a stereo vision FOV can be shown to extend from $\alpha_1$ to $\beta_2$.

In an aspect, the fisheye lens 330 and imaging plane 310 can be considered a SVP imaging system. The fisheye lens 330 aperture is simplified to an optical center C (see FIG. 3) which can be located along the axis of symmetry of mirror 340 at a distance d from the origin O, such that d=|OC|. Mirror 340 used in system 300 can have any of a plurality of shapes geometries, such that the surface $S_r(t)=[z(t), r(t)]$. As such, a generic parameterization can relate the shape of the mirror by $$Az^2 + r^2 + Bz = C, \qquad (1)$$

where A, B, and C are parametric values. This parameterization can accommodate parabolic (A=0), elliptic (A>0), hyperbolic (A<0), and spherical (A=1, C+(B²/4)>0) mirrors. As parameter A varies, systems with different mirror shapes can be analyzed in a unified manner wherein a point on the mirror surface is defined by $S_r(t)=[z(t), r(t)]$ where $$\begin{cases} z(t) = t \\ r(t) = \sqrt{C - Bt - At^2} \end{cases} \quad (2)$$

As such, where a mirror is hemispheric and centered at [0,u] with a radius R, the parameters can be given by A=1, B=−2u, and C=R²−(B²/4). Similarly, where the mirror is conic with a focus located at [0,p] and with an eccentricity e, the parameters can be given by A=1−e², B=−2p, and C=−p². The eccentricity, e, relates to the conic type, wherein an ellipse has (e<1), a parabola has (e=1), and a hyperbola has (e>1).

In imaging the scene at focal plane 310, a scene point P can be imaged after it is reflected at some point on the mirror 340 surface. The image of P can be traced by incident ray 360 ($V_i(t)$) and reflected ray 362 ($V_r(t)$) to image point 364. As such, scene point P can be parameterized by the distance, k, to the reflection point $S_r(t)$. Thus P can be expressed as $$P(t,k) = S_r(t) + k \cdot V_i(t) = [p_z(t,k), p_r(t,k)]. \quad (3)$$

Based on Eq. (2), all the terms in Eq. (3) can be analytically derived. In particular, a scene point $P(t,k) = [p_z(t,k), p_r(t,k)]$ can be given by $$\begin{cases} p_z(t,k) = N_z/D_z \\ p_r(t,k) = N_r/D_r, \end{cases} \quad (4)$$

where $N_z = B^2(dk + t(3k + \Omega)) + 4(Ck(-d + t - 2At) + C\omega t + At^2((1+A)dk + (-1+A)t(k+\Omega))) - \ldots 4B(Ck + t(-(1+A)dk + t(k - 2Ak - (-1+A)\Omega)));$ $N_r = \sqrt{C - t(B + At)}(B^2(k + \Omega) - 4B(-dk + t(\Omega - A(k+\Omega))) + 4(C(-k+\Omega) + \ldots At(2dk + (-1+A)t(k+\Omega))));$ $D_z = D_r = \Omega(B^2 + 4(-1+A)Bt + 4(C + (-1+A)At^2));$ $\Omega = \sqrt{C + d^2 - 2dt - t(B + (-1+A)t)}.$ As such, the upper FOV boundary of the fisheye image, e.g., the refractive image of the scene, $\alpha_1$, can be determined by the selection of the fisheye lens. Further, the lower FOV boundary of the fisheye image, $\alpha_2$, can be determined by the half-diameter of the mirror, w, and the position of the fisheye lens center, d. Moreover, a point at the edge of the mirror can be expressed as $E_m = [(-B + \sqrt{B^2 - 4A(w^2 - C)})/(2A), w]$. Solving the equation $S_r(t_m) = E_m$, the lower FOV boundary for the fisheye image, $\alpha_2$, can be obtained as $$\alpha_2 = \arctan(2wA/(d - B + \sqrt{B^2 - 4A(w^2 - C)})). \quad (5)$$

The upper FOV boundary of the catadioptric image, $\beta_1$, can be formed due to occlusion by fisheye lens 330. Wherein the half-diameter of the fisheye lens 330 is m, then a point at the edge of the fisheye lens 330 can be expressed as $E_f = [d + \tan(\alpha_1)^*m, m]$. Thus, the incident ray passing $E_f$ can be determined by solving the equation $P(t_f, k_f) = E_f$. As such $\beta_1$ can be determined by $V_i(t_f)$. Similarly, the lower FOV boundary of the catadioptric image $\beta_2$ can be obtained as $V_i(t_m)$, where $t_m$ is calculated by solving the equation $S_r(t_m) = E_m$. Wherein distance k is not related to the angle of the ray, it does not appear in the FOV boundary calculation results. Of note, the above discussion is based on the assumption that the lateral shift of the entrance pupil of fisheye lens 330 is negligible. Where the entrance pupil shift is significant, high-order calculations are needed, though not discussed for clarity and brevity. The use of such high-order calculations expressly does not depart from the scope of the present disclosure.

As demonstrated, the geometry of a panoramic stereo catadioptric imaging system design can be configured to emphasize different aspects to suit application requirements. In particular, alterations to the geometry can result in corresponding changes in the entire FOV, the stereo FOV, the image resolution, the equivalent length of a baseline for stereo vision, the overall footprint of a system, etc.

Image resolution can be defined as the number of image pixels per unit vertical FOV, which can be expressed as $\Delta N/\Delta\Theta$, where $\Delta N$ is the number of pixels along a radial image interval and $\Delta\Theta$ is the vertical FOV represented by these pixels. Whereas the resolution of a fisheye image will be fixed once a fisheye lens camera is selected, catadioptric image resolution adaptation is of more significance. For clarity and brevity, assume that the fisheye image has a constant image resolution in the radial direction and that the image resolution is associated with an image resolution index (IRI) of 1. By using IRI=1, the image resolution analysis is normalized to the fisheye image. As the FOV is extended after reflection from a reflective element, e.g., 340, the catadioptric image will have a lower image resolution. The average IRI of the catadioptric image can thus be determined by $(90° + \alpha_2)/(\beta_1 - \beta_2)$. Of note, where the image resolution is not uniform along the image radius, the average IRI may not be linear when it is compared between systems. In practice, the resolution difference between the fisheye image and the catadioptric image can reduce the stereo matching accuracy. A partial solution can be to match the resolution by applying Gaussian smoothing with different kernel sizes to the two image regions.

Of further consideration, focusing range in a system comprising a refractive element, e.g., fisheye lens 330, and a reflective element, e.g., mirror 340, can requires different focusing range settings for each element. A partial solution is to enlarge the depth of field of the fisheye lens by employing a small aperture size at the cost of reducing the image acquisition frame rate. For clarity and brevity, the aperture size of the fisheye lens is assumed to be sufficiently small such that the IRI is simply defined based on the angular FOV.

For stereo vision, the baseline distance can be important for the accuracy of 3D model construction. Where the catadioptric image is SVP, the baseline of the proposed system is simply the distance between the optical center of the fisheye lens and its virtual point reflected behind the mirror. However, when the catadioptric image is non-SVP, the extended incident light rays can intersect the optical axis in an interval instead of a single virtual viewpoint. In this case, an equivalent baseline can be defined based on the average of these intersection points.

As previously disclosed, the distance of the fisheye lens, d, the selection of the fisheye lens, and the parameters of the mirror can impact the characteristics of a panoramic stereo catadioptric imaging system. When an off-the-shelf fisheye lens is selected, the parameters of the fisheye lens are, in effect, predefined. With respect to mirror selection, mirror shapes can include spherical or conic shapes. Spherical mirror parameters can include the radius, R, and the half-diameter, w. Conic mirror parameters can include the eccentricity, e, the focus of the mirror, p, and the half-diameter of the mirror, w.

Figure 4:
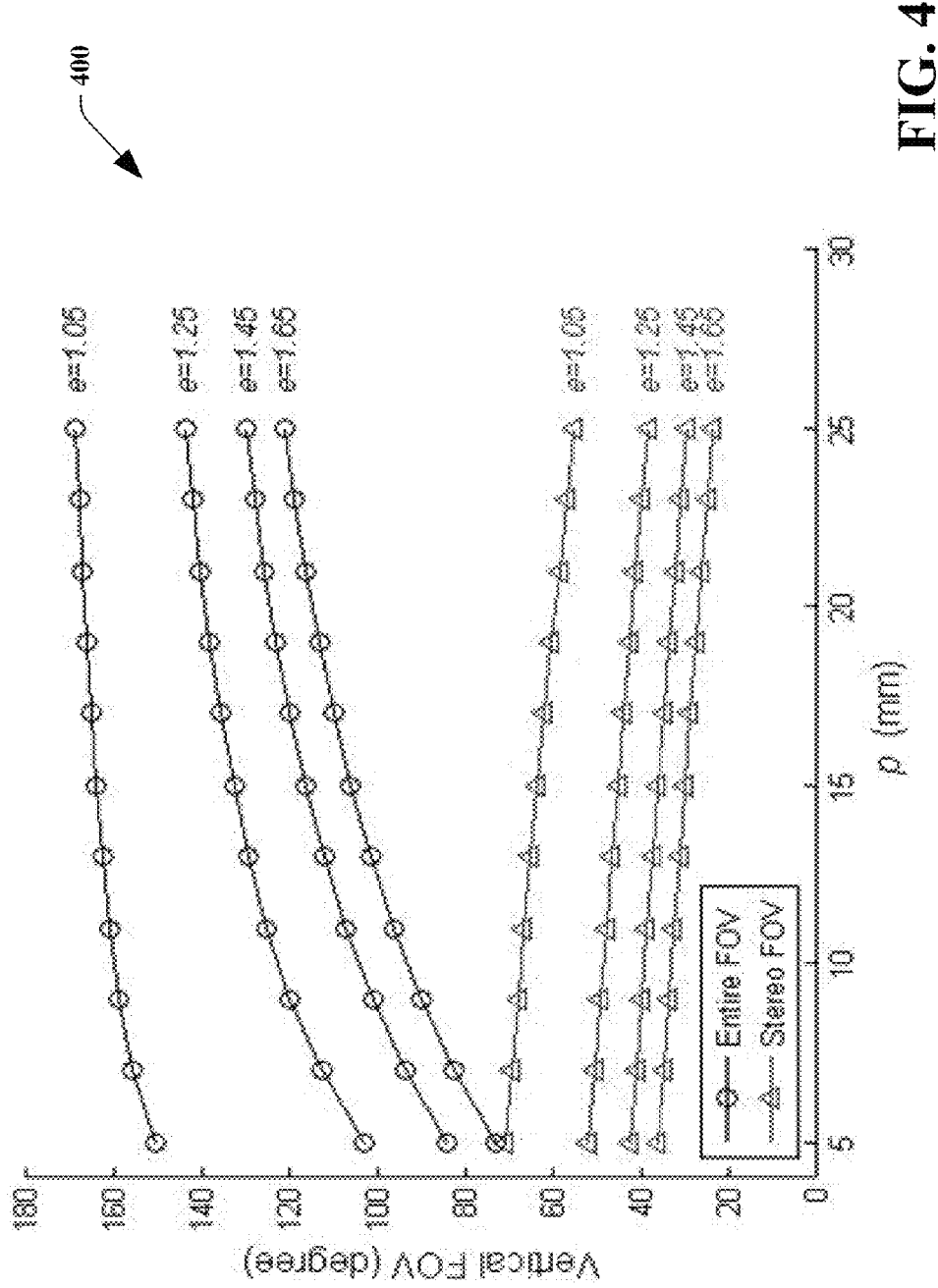
FIG. 4 illustrates parametric data for an exemplary model of a system facilitating panoramic stereo catadioptric imaging in accordance with an aspect of the disclosed subject matter.
Figure 5:
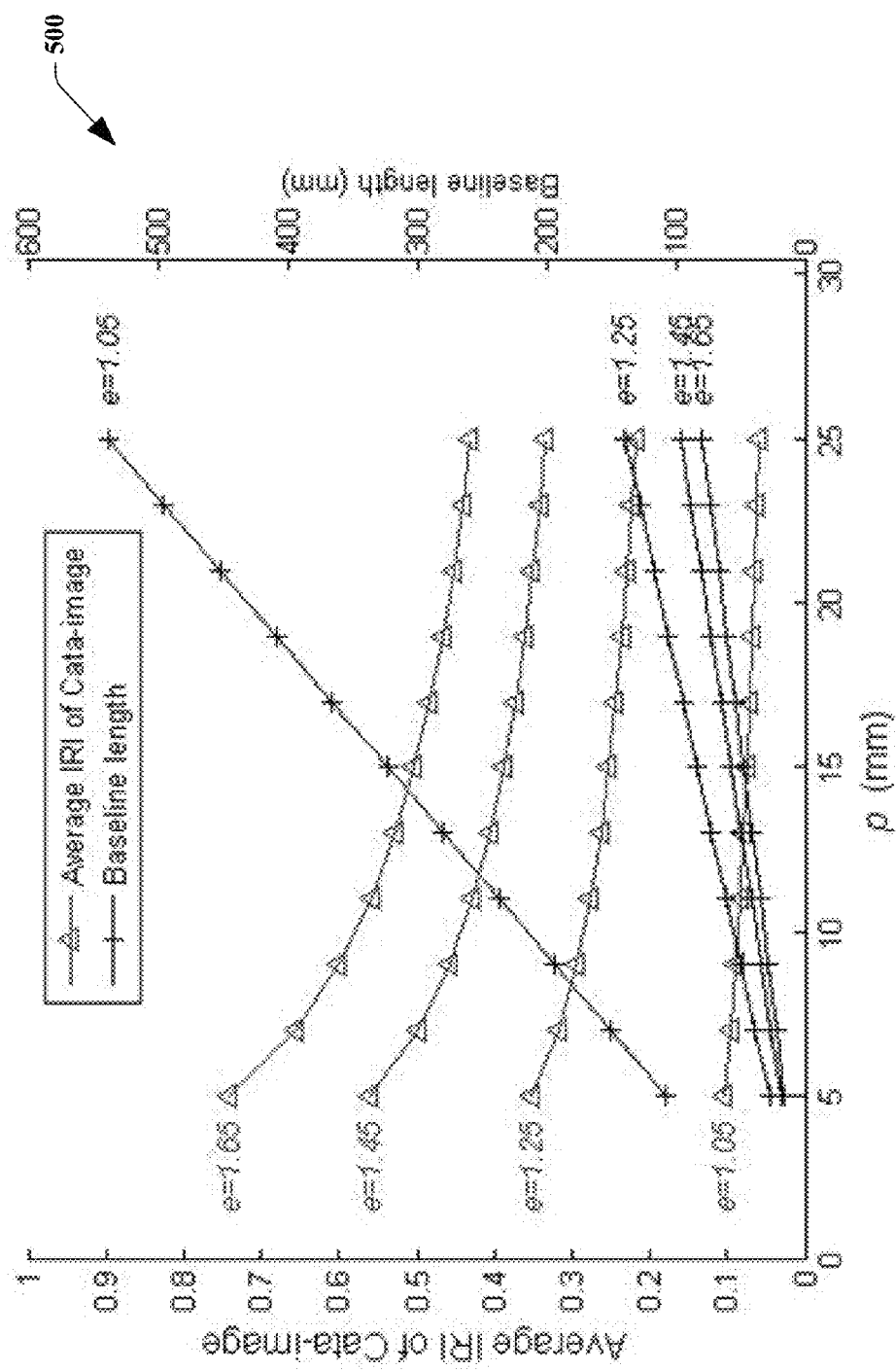
FIG. 5 illustrates parametric data for an exemplary model of a system facilitating panoramic stereo catadioptric imaging in accordance with an aspect of the disclosed subject matter.

FIGS. 4 and 5 illustrate parametric data for an exemplary panoramic stereo catadioptric imaging system. Turning to FIG. 4, illustrated is parametric data 400 for an exemplary model of a system facilitating panoramic stereo catadioptric imaging in accordance with an aspect of the disclosed subject matter. Given an exemplary panoramic stereo catadioptric imaging system wherein a hyperbolic mirror is employed subject to the SVP constraint, this condition can result in the light rays being captured and directed to the hyperbolic focus point inside the mirror. The SVP constraint causes the center of the fisheye lens to be located at the second focus of the hyperbolic mirror, and thus $$d = -p + 2e^2 p/(e^2 - 1). \quad (6)$$

By expressing d in this form, e.g., using e and p, d does not appear in the design parameters. Further, for a fixed mirror size, the number of design parameters is further reduced to two, e.g., e and p, where e satisfies e>1. As such, a the mirror half-diameter can be arbitrarily selected to be 100 mm and the fisheye lens half-diameter to be 25 mm to generate parametric data 400.

More specifically, FIG. 4 illustrates the variation of the entire FOV and stereo FOV with respect to e and p. For a specific e, as p varies, a larger entire FOV is coupled with a smaller stereo FOV and vice versa. When p is fixed, a decrease of e relates to an increase in both the entire FOV and the stereo FOV. However, turning to FIG. 5, it can be seen in the parametric data 500, that decreasing e can lead to a degradation of the catadioptric image resolution. Parametric data 500 highlights that as catadioptric image resolution, measured as average IRI, and the stereo baseline distance increase, 3D reconstruction precision improves. It can be noted that for a fixed e, catadioptric image resolution and the stereo baseline distance have an inverse relationship. Further, for a fixed p, a decrease in e can result in a longer baseline, however, this improvement in baseline length must be traded against an undesired decrease in image resolution.

In general, FIGS. 4 and 5 illustrate that generally some compromise has to be made in performance to meet real-world applications conditions. As such, computation of an optimal system design is strongly dependent on the prioritization of the various parameters presented. As such, the disclosed subject matter can be applied on a case-by-case basis subject to selection of a particular prioritization of parameters.

Figure 6:
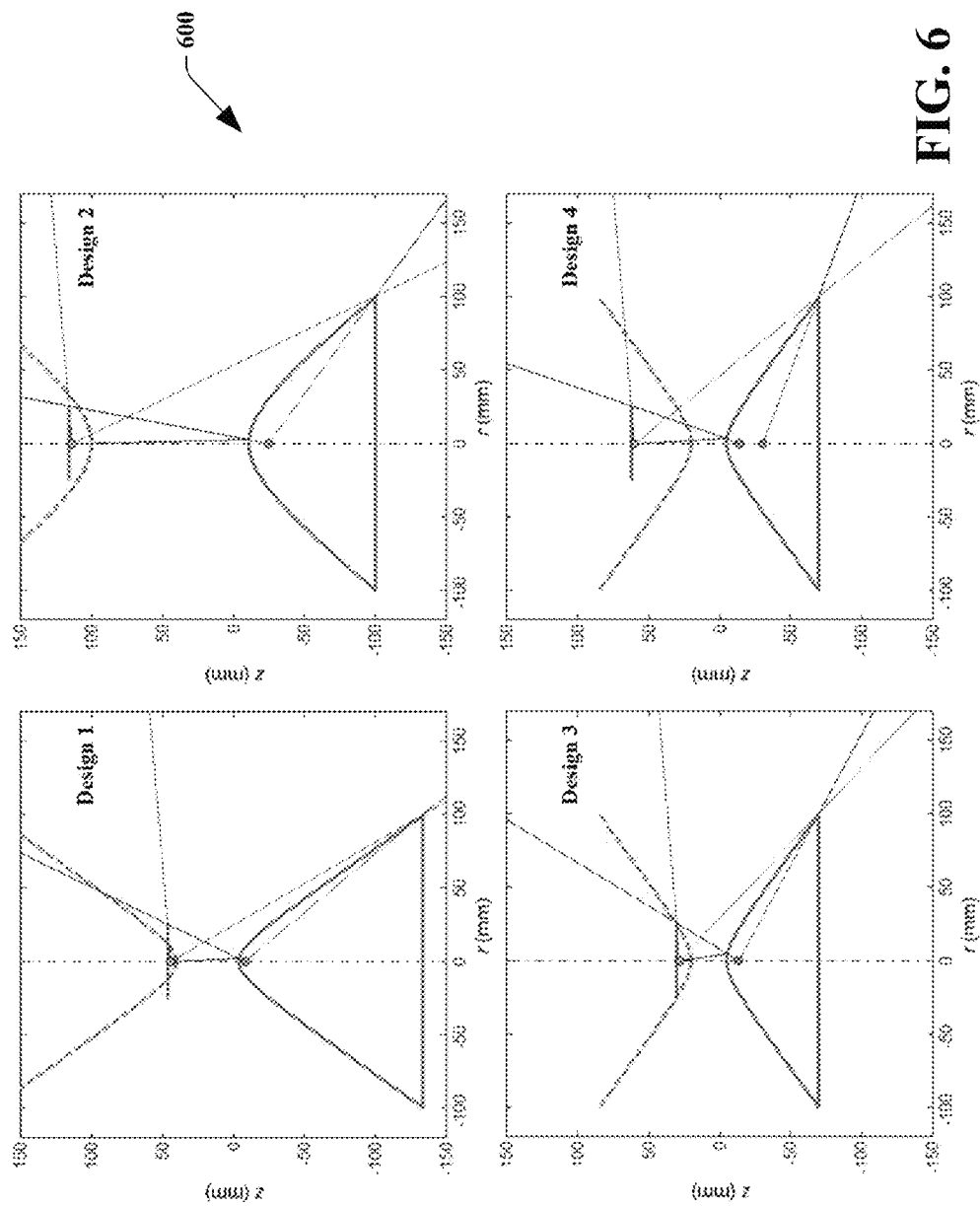
FIG. 6 illustrates designs and related features of exemplary models of systems facilitating panoramic stereo catadioptric imaging in accordance with an aspect of the disclosed subject matter.

FIG. 6 depicts four exemplary designs and their related features 600 in accordance with an aspect of the disclosed subject matter. Of note, designs 1, 2 and 3 are subject to SVP constraint while design 4 is not. By relaxing the SVP constraint, more design flexibility can be enabled. As an example, in design 3, the catadioptric image resolution reaches about half of that in the fisheye image. However, the baseline length of design 3 is small in comparison to the other designs in 600. By relaxing the SVP constraint imposed on design 3, design 4 can result, in which the fisheye lens can be moved farther from the mirror. Moving the fisheye lens farther from the mirror effectively elongates the equivalent baseline. The cost for this design flexibility, e.g., moving the fisheye lens farther from the mirror, is that the resultant system, e.g., design 4, does not meet the SVP constraint. Where the SVP constraint is not imposed, a camera model that can accommodate the non-SVP nature of the system can be needed.

A 3D reconstruction can employ a computational model to establish a mapping between the light rays in 3D space and the pixels in the images. In order to accommodate the non-SVP nature of the imaging process, a generic radial distortion model can be used. A generic radial distortion model can assume that imaging geometry is radially symmetric to the optical axis. As such, an image distortion center can be defined as the intersection of the optical axis with the image plane, see FIG. 7. An image impinging on a sensor can be decomposed into a series of distortion circles having a common distortion center. Light rays associated with pixels lying on the same distortion circle can be said to lie on a right 3D viewing cone centered on the optical axis. As such, each viewing cone can be considered as an individual perspective camera and it can be defined by a vertex position, v(c), on the optical axis and a focal length, f(c), where c is the image radial distance to the distortion center. A viewing cone can alternatively be parameterized by v(c) and θ(c), where θ(c) is a half of the opening angle of the viewing cone. A mapping between v(c) and θ(c) can be expressed as tan(θ(c))=c/f(c).

Figure 7:
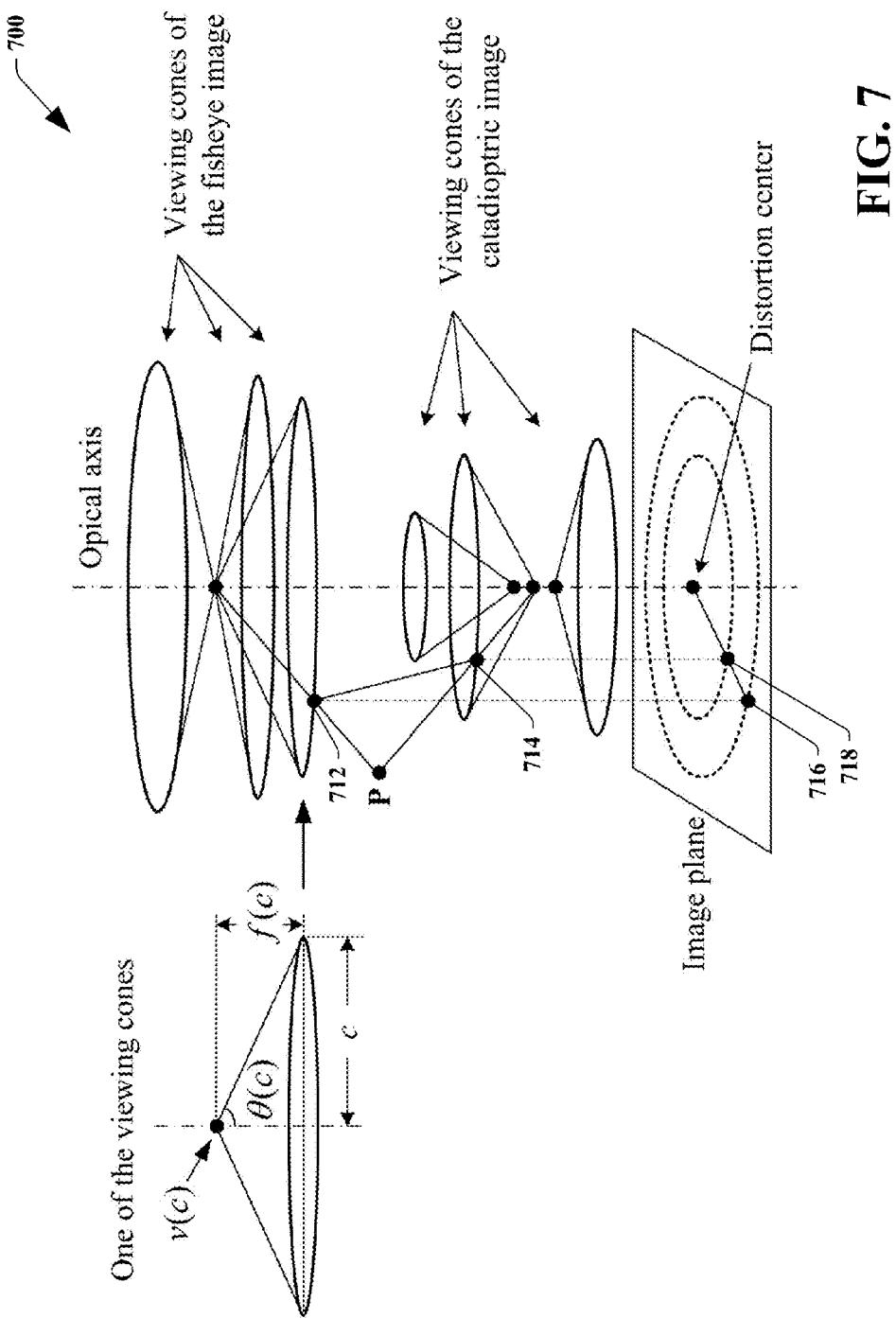
FIG. 7 depicts an illustration of exemplary optical aspects of systems facilitating panoramic stereo catadioptric imaging in accordance with an aspect of the disclosed subject matter.

As illustrated in FIG. 7, an exemplary model can consists of two clusters of viewing cones. One cluster can describe the fisheye image and the other can describe the catadioptric image. Based on these viewing cones, the imaging geometry can be fully described. Assuming variation of the optics along the image radius is smooth in the fisheye image and the catadioptric image, the opening angles and vertex positions of the viewing cones can be parameterized with polynomials. In a particular example, the opening angle can be expressed as $$\theta(c) = \begin{cases} \theta_m(c) = a_0 + a_1 \cdot c + a_2 \cdot c^2 + \ldots + a_{N_1} \cdot c^{N_1}, c \le C_b \\ \theta_f(c) = b_0 + b_1 \cdot c + b_2 \cdot c^2 + \ldots + b_{N_2} \cdot c^{N_2}, c > C_b \end{cases} \quad (7)$$

where $C_b$ is a radius corresponding to the circular boundary between the fisheye image and the catadioptric image. Similarly, the position of a viewing cone vertex can be expressed as $$v(c) = \begin{cases} v_m(c) = g_0 + g_1 \cdot c + g_2 \cdot c^2 + \ldots + g_{N_3} \cdot c^{N_3}, c \le C_b \\ v_f(c) = h_0 + h_1 \cdot c + h_2 \cdot c^2 + \ldots + h_{N_4} \cdot c^{N_4}, c > C_b. \end{cases} \quad (8)$$

Following this, the generic radial distortion model can be fully expressed as the location of the distortion center, the focal length function, f(c), and the vertex position function, v(c), for the set of viewing cones (f(c) can equivalently be represented by θ(c)). Of note, a SVP constrained model for the fisheye image can correspond to the case when $h_i$=0, for all i≠0. Similarly, a SVP constrained model for the catadioptric image can correspond to the case when $g_i$=0, for all i≠0.

Each distortion circle in the generic radial distortion model illustrated in FIG. 7 can be regarded as a perspective camera and it can be calibrated by observing points on a calibration plane at several unknown scene poses. A dense plane-image correspondence can be involved, which can be obtained by using an LCD panel as an active calibration plane. This calibration procedure can be further optimized by a maximum-likelihood method. Whereas the exemplary system is rotationally symmetric, the epipolar geometry can be greatly simplified. For example, FIG. 7 shows that the corresponding image pair of an object point P is located on a radial line that passes the distortion center. By a latitude-longitude unwrapping, an original image can be rectified to a panoramic stereo image pair, 716 and 718. Therefore, stereo matching can be performed by one-dimensional search along a vertically collinear scan line. Once the stereo image correspondence of a scene point is established, its position in 3D space can be estimated by triangulation based on the calibrated computational model. Further, once the computational model is calibrated, the FOV boundary parameters can be computed as the directions of the light rays related with the pixels on the boundaries of the fisheye image, 712, and the catadioptric image, 714.

Figure 8:
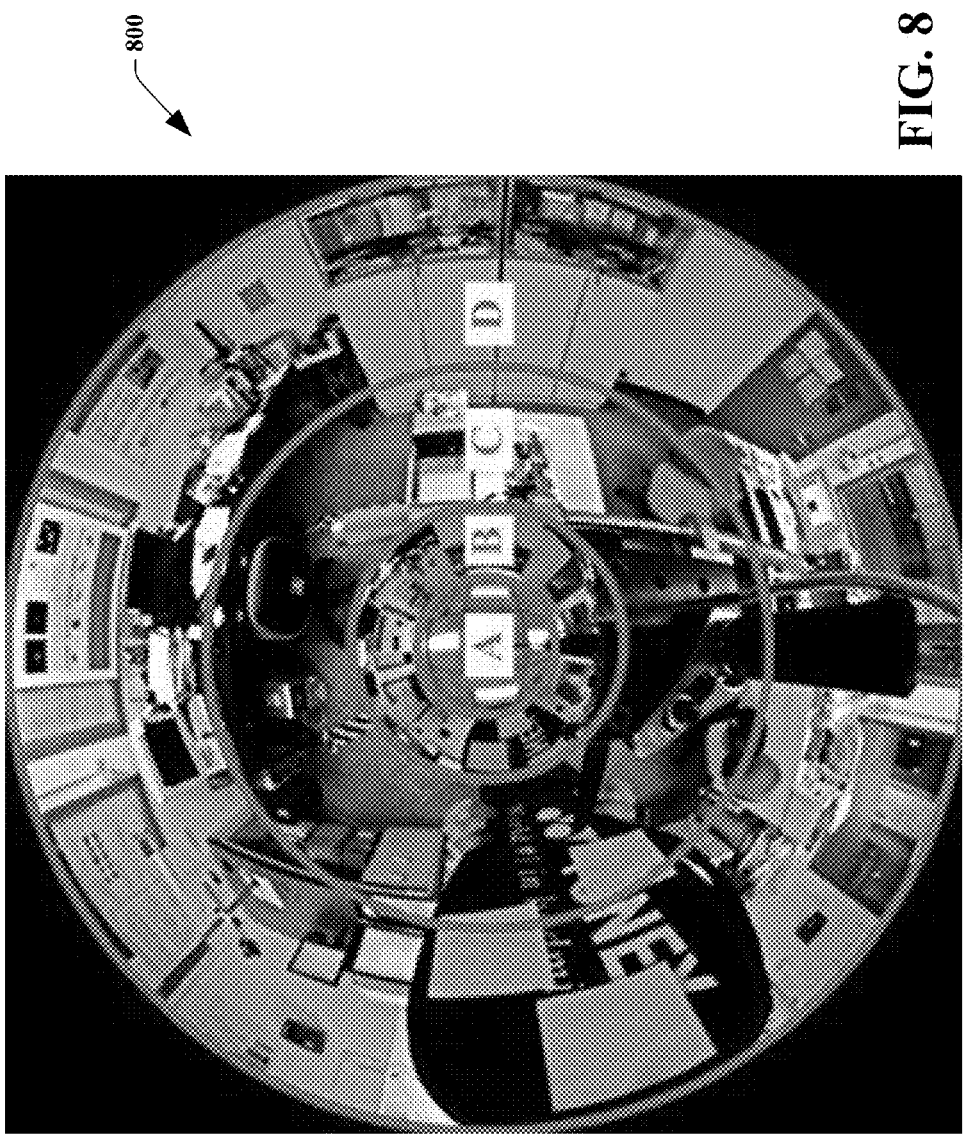
FIG. 8 depicts an image captured from an exemplary system for panoramic stereo catadioptric imaging in accordance with an aspect of the disclosed subject matter.

FIG. 8 depicts an image 800 captured from an exemplary system for panoramic stereo catadioptric imaging in accordance with an aspect of the disclosed subject matter. The exemplary system used to capture image 800 is comprised of off the shelf components connected to an optical mounting stage. These include a color video camera with a ⅔" CCD and a resolution of 1360 pixels by 1024 pixels with a Fujinon 1.4 mm fisheye lens (FE185C046HA-1) mounted to the camera and set to an F16 aperture. The half-diameter of the fisheye lens is 28.3 mm. The exemplary system further comprises a hyperbolic mirror (salvaged from a commercial omnidirectional sensor). The half-diameter of the mirror is 44 mm. The vertex to vertex distance between the fisheye lens and the mirror surface is set to 52.2 mm, ±0.1 mm. The eccentricity of the mirror is 1.44 with a focus of 20.1 mm. Based on the disclosed geometry, the exemplary system parameters can be computed. The parameters include an entire FOV of 127.2°, a stereo FOV of 19.7°, an equivalent baseline length of 63.3 mm, and an average IRI of 0.35.

For the exemplary system, we assume a SVP model for the fisheye image and a non-SVP model for the catadioptric image. Thus, for the catadioptric image: $a_0=0$, $a_1=1.47420$, $a_2=-0.0035$, $g_0=70.3342$, $g_1=-0.1441$. For the fisheye image, $b_0=0$, $b_1=0.2830$, $b_2=-0.0001$, $h_0=0$. Based on the calibrated computational model, the FOV boundaries can be estimated as: $\alpha_1=7°$, $\alpha_2=-65°$, $\beta_1=60°$, $\beta_2=-14°$. The angles are defined with respect to the horizontal. As such, the entire FOV is 125° (calculated as $\beta_1-\alpha_2$), within which the stereo FOV is 21° (calculated as $\alpha_1-\beta_2$). With the calibrated model, all the vertexes of the viewing cones are known. Following this, the equivalent baseline can be calculated as the distance between the optical center of the fisheye lens and the average position of the vertexes of the catadioptric viewing cones, which can be determined to be 63.2 mm. The average IRI of the catadioptric image is 0.33.

Image 800 is taken in the middle of a generally square shaped room with the described exemplary system. Image 800 can be decomposed into four concentric circular image regions, A-D, marked in image 800. Regions A and B can be captured from rays reflecting from the mirror through the fisheye lens and form the catadioptric image. Regions C and D can be captured through the fisheye lens alone and form the refractive image, e.g., fisheye image. Regions B and D can have an overlapping FOV and form the stereo image pair. As such, the corresponding scene points can be radially collinear.

Figure 9:
FIG. 9 illustrates an unwrapped image captured from an exemplary system for panoramic stereo catadioptric imaging in accordance with an aspect of the disclosed subject matter.

FIG. 9 illustrates an unwrapped image 900 captured from an exemplary system for panoramic stereo catadioptric imaging in accordance with an aspect of the disclosed subject matter. The exemplary system can be the same disclosed for capturing image 800. Regions B and region D in image 900 are overlaid and only region D is displayed. The entire vertical FOV is extended beyond regions B and D, this enables both the ceiling and floor to be visible in image 900. Correspondences between a set of sample points can be established by a window-based cross-correlation search along vertical scan lines in image 900.

Figure 10:
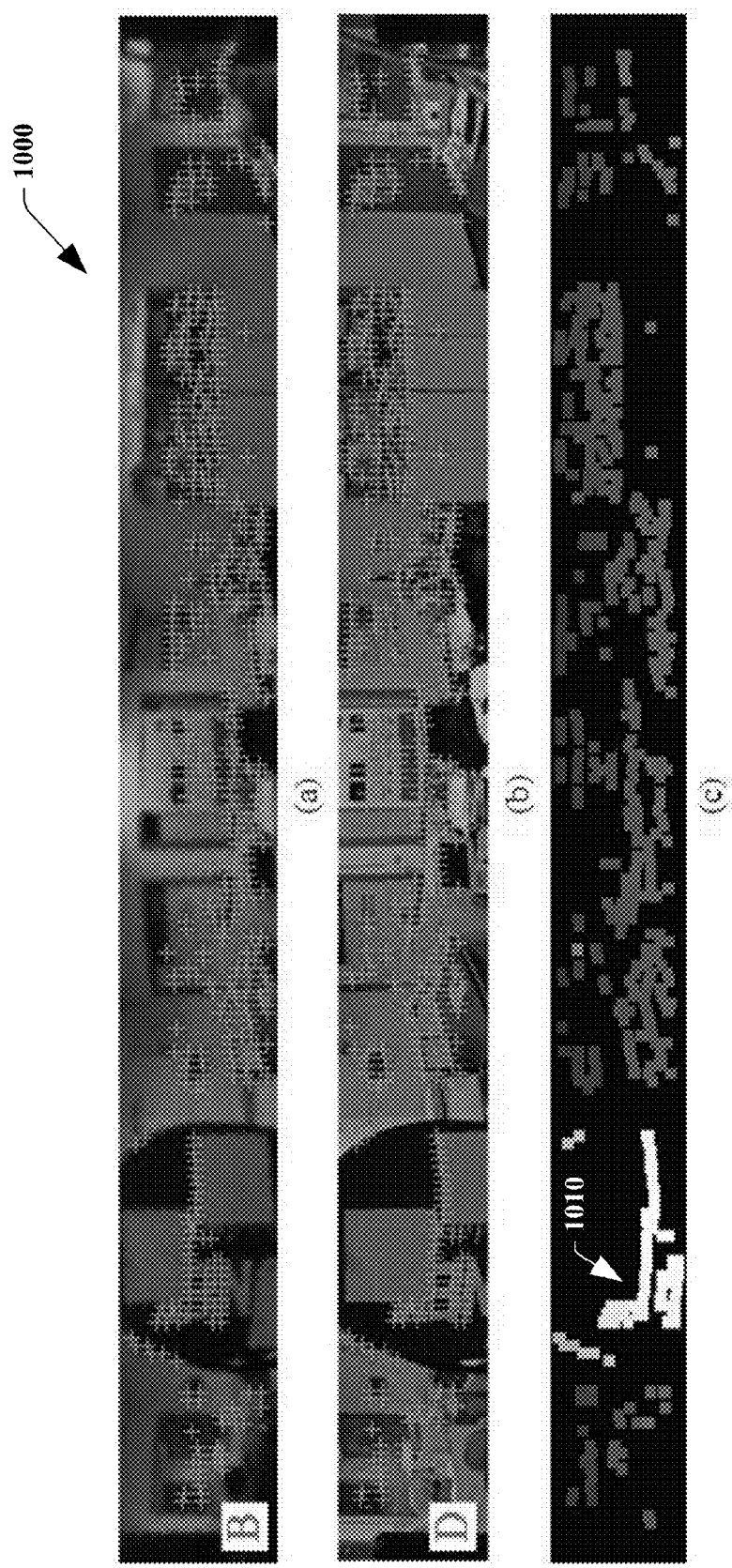
FIG. 10 depicts spatial data and images related to an image captured from an exemplary system for panoramic stereo catadioptric imaging in accordance with an aspect of the disclosed subject matter.

Turning to FIG. 10, illustrated is spatial data and images 1000 related to an image captured from an exemplary system for panoramic stereo catadioptric imaging in accordance with an aspect of the disclosed subject matter. The exemplary system can be the same disclosed for capturing image 800. Whereas, correspondences between a set of sample points can be established by a window-based cross-correlation search along vertical scan lines, established corresponding points can be displayed as crosses over the image pair as illustrated in image 1000(a), the region B image, and image 1000(b), the region D image. The disparity between a matching point pair can then be computed as the vertical position difference in the stereo pair as previously disclosed herein. The disparity can encode depth information of that point in 3D space, e.g., spatial distance information. Image 1000(c) is an image of the determined disparity values of the matching image pairs for image 1000(a) and 1000(b). Each image pair can be plotted with a square block as a function of brightness. The brighter the block, the larger the disparity of the corresponding image pair. The larger the disparity, the closer the scene object to the exemplary system. In FIG. 1000(c), a nearby object near the left part of the figure results in blocks of brighter color 1010. In certain embodiments, determining 3D spatial information can be used to locate nearby objects, for example, to enable obstacle detection and avoidance in devices. Of note, that there are some mismatches in 1000(c), however, by using more advanced matching methods, e.g., rather than window-based cross-correlation search along vertical scan lines with optimization, improved correspondence matching can be achieved with denser points and improved precision. All such advanced matching methods as applied to the disclosed subject matter are expressly within the present scope of disclosure despite not being discussed more herein for the sake of brevity and clarity.

Figure 11:
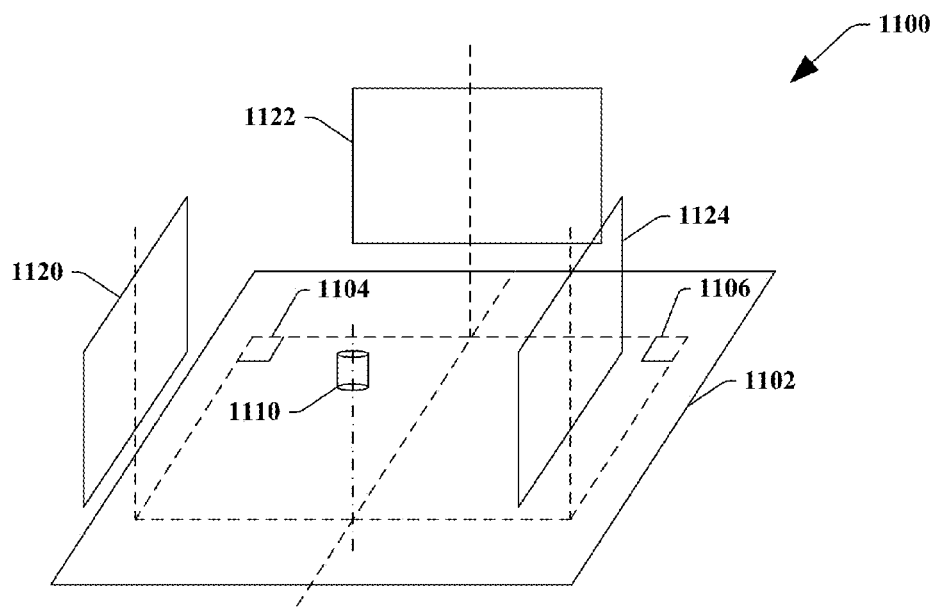
FIG. 11 illustrates an exemplary schematic of a layout for, and an exemplary image captured from, a system for panoramic stereo catadioptric imaging in accordance with an aspect of the disclosed subject matter.
Figure 11:
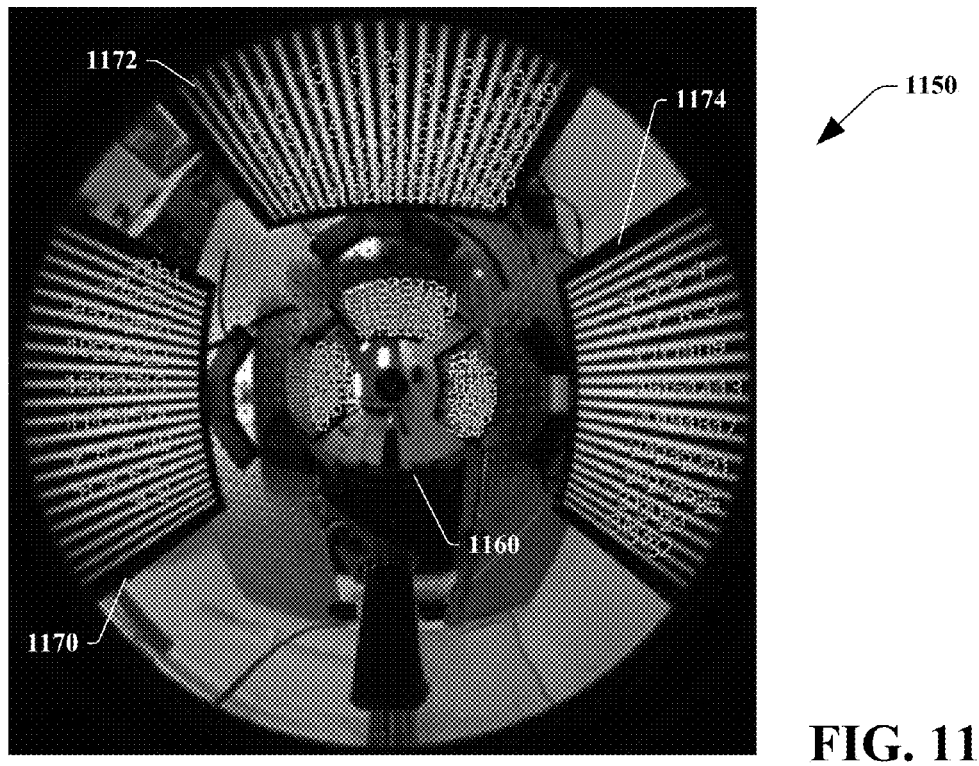

FIG. 11 illustrates an exemplary schematic of a layout 1100 for, and an exemplary image 1150 captured from, a system for panoramic stereo catadioptric imaging in accordance with an aspect of the disclosed subject matter. A test environment can be setup by positioning LCD panels at three orthogonal positions on an optical table as shown in layout 1100. The distance from an LCD to the system can be set to 250 mm for each position in the test environment. 3D reconstruction can be performed for a set of grid sample points on the LCDs at each position. Image 1150 illustrates the correspondences of the sample points, which can be automatically established by displaying structured spatial-temporal coding patterns on the LCDs and matching the points with the same encoding. Based on a phase shift method, the correspondences can be established with sub-pixel localization precision.

In image 1050, a total of 119 sample points are used. Further, the true experimental position of the LCD points are known for image 1050. As such, the reconstructed 3D points can be transformed to align with the LCD coordinates and be compared with the known experimental data associated with image 1050. The computed angle 1104 and angle 1106 (see layout 1100) are 88.4° and 91.7° respectively, where the experimental setup is 90° for both. Thus the angular error between the experimental setup and that computed from image 1150 is about 1.8%. Similar error computations can be performed for the positions of the sample points on the LCD panels. The average computed 3D spatial positional error is 8.3 mm. Given that the LCD panels were placed 250 mm from the system, the average spatial computation error is about 3.3%. Further, given that the image resolution is not uniform on an image, the position reconstruction error varies in space. In image 1150, the maximum error for computed position is 7.9%.

Figure 12:
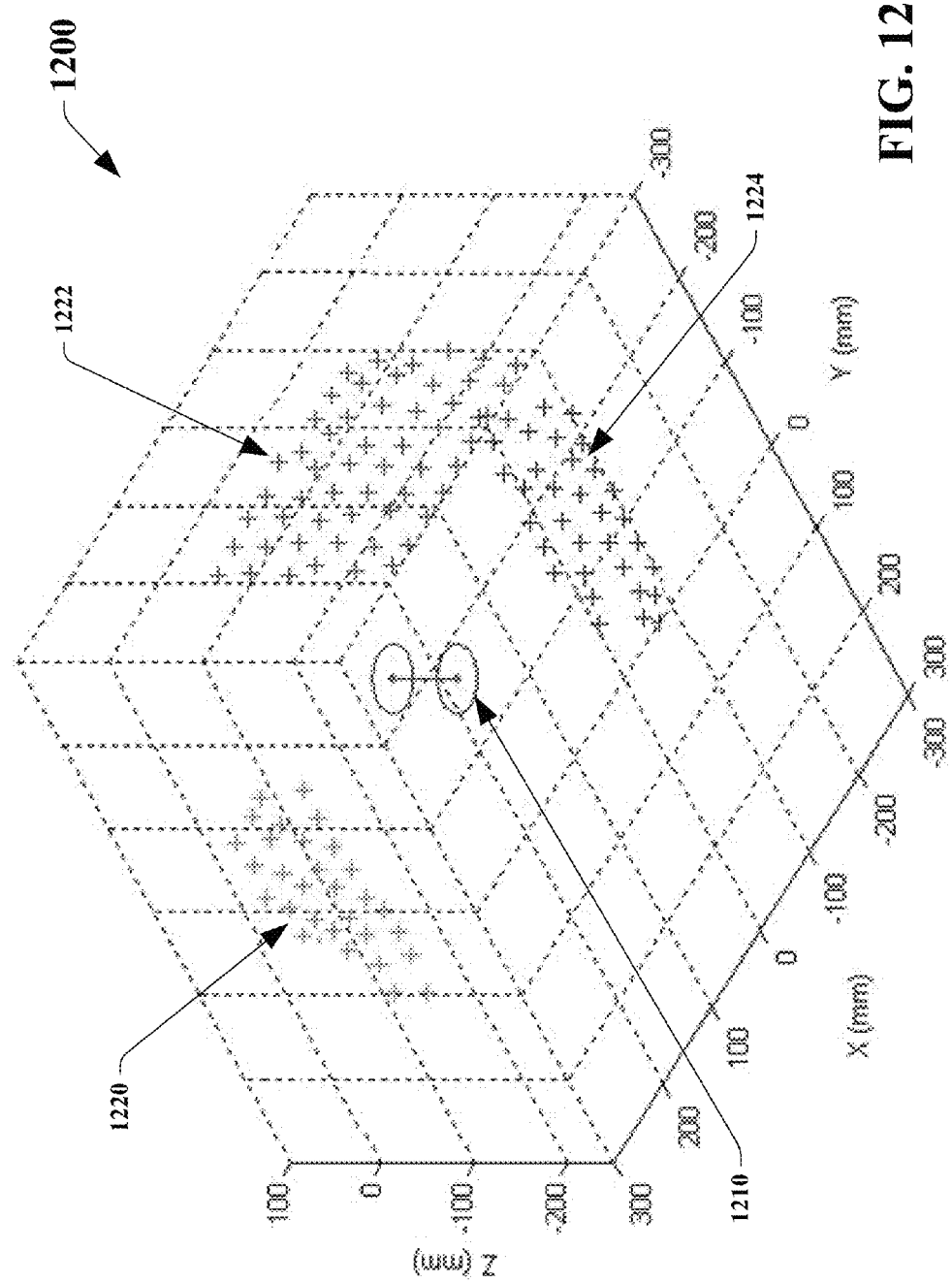
FIG. 12 illustrates a plot of spatial relationship data from an analysis of an image captured from an exemplary system for panoramic stereo catadioptric imaging in accordance with an aspect of the disclosed subject matter.

FIG. 12 illustrates a plot 1200 of spatial relationship data from the computations done with regard to FIG. 11, more particularly to image 1150. Plot 1200 is a visualization of the 3D reconstruction results. The distributions of the reconstructed sample points in 3D, e.g., 1220, 1222, and 1224, are consistent with the planar structures of the LCD panels, e.g., 1170, 1172, and 1174, without significant distortion. Plot 1200 illustrates that within the tested working range, acceptable results in 3D reconstruction can be achieved with an exemplary system. It is worth noting that the precision of the 3D reconstruction is dependent on a variety of factors such as the length of equivalent baseline, resolution of the input image, object distance, and calibration precision. For the presented experimental setup, the effective working range for depth perception is limited to indoor environment as the equivalent baseline is only 63.2 mm. As we have shown in the design analysis, this can be alleviated by selecting more appropriate system design parameters. An increase in image pixel resolution of the camera can also improve the 3D reconstruction result as each pixel would have with a finer angular resolution.

Figure 13:
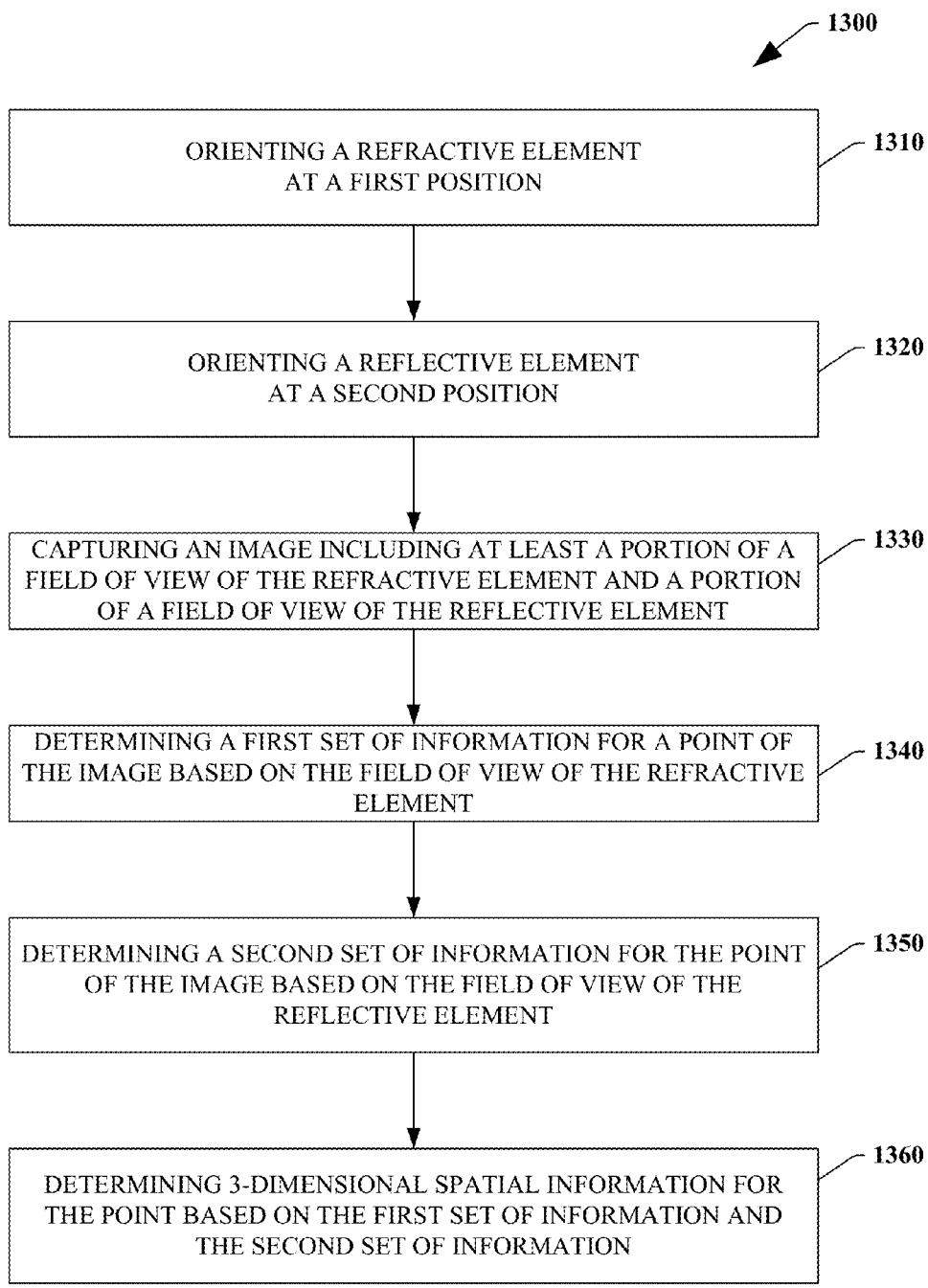
FIG. 13 illustrates a method that facilitates panoramic stereo catadioptric imaging in accordance with an aspect of the disclosed subject matter.
Figure 14:
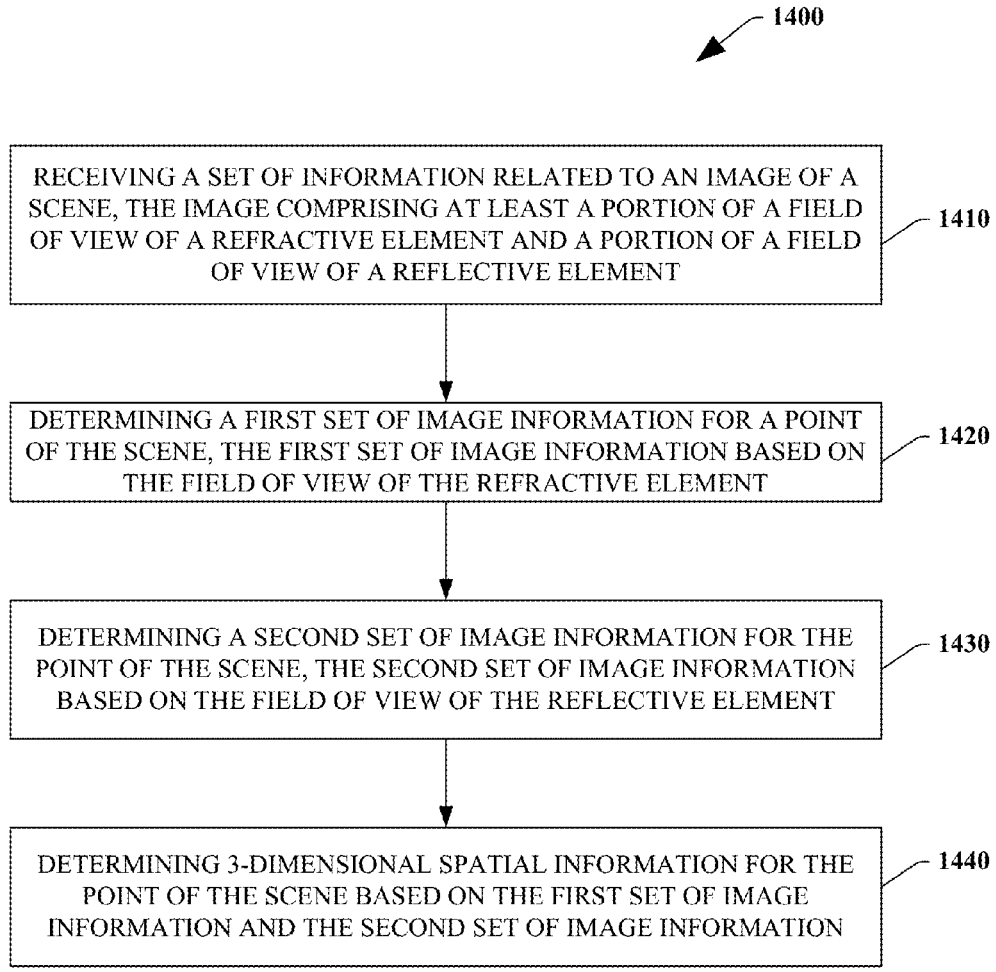
FIG. 14 depicts a method that facilitates panoramic stereo catadioptric imaging in accordance with an aspect of the disclosed subject matter.

FIGS. 13-14 illustrate methods and/or flow diagrams in accordance with the disclosed subject matter. For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

FIG. 13 illustrates a method 1300 that facilitates panoramic stereo catadioptric imaging in accordance with an aspect of the disclosed subject matter. At 1310 a refractive element can be oriented at a first position. At 1320 a reflective element can be oriented at a second position. At 1330, an image can be captured. The image can include at least a portion of a FOV of the refractive element and a portion of the FOV of the reflective element. The portion of the FOV of the reflective element can also be understood to be a catadioptric FOV. Moreover, the portion of the FOV of the refractive element and the portion of the FOV of the reflective element can overlap and capture pairs of scene points.

At 1340, a first set of information for a point of the image can be determined. This first set of information for the point can be based on the FOV of the refractive element. At 1350, a second set of information for the point of the image can be determined. This second set of information for the point can be based on the FOV of the reflective element.

At 1360, 3D spatial information can be determined for the point. This determination can be based on the first and second sets of information for the point. In an aspect, the first and second sets of information can be associated with a scene point pair as disclosed elsewhere herein. At this point method 1300 can end.

FIG. 14 illustrates a method 1400 that facilitates panoramic stereo catadioptric imaging in accordance with an aspect of the disclosed subject matter. At 1410, a set of information related to an image of a scene can be received. The image can comprise at least a portion of a FOV of a refractive element and a portion of a FOV of a reflective element. The FOV of the reflective element can also be termed a catadioptric FOV because the reflected image is passed through a refractive element to reach an image plane. In an aspect the FOV of the refractive element and the FOV of the reflective element can overlap. As such, a refracted information and catadioptric information can be received for the same scene.

At 1420, a first set of image information can be determined for a point of the scene in the received image. The first set of image information can be based on the FOV of the refractive element. At 1430, a second set of image information can be determined for the point of the scene in the received information related to the image of the scene. The second set of image information can be based on the FOV of the reflective element.

At 1440, 3D spatial information for the point of the scene can be determined. The disparity between the first set of information and the second set of information resulting from different focal geometries for the refracted and reflected images related to the scene can encode spatial information. At this point method 1100 can end.

Figure 15:
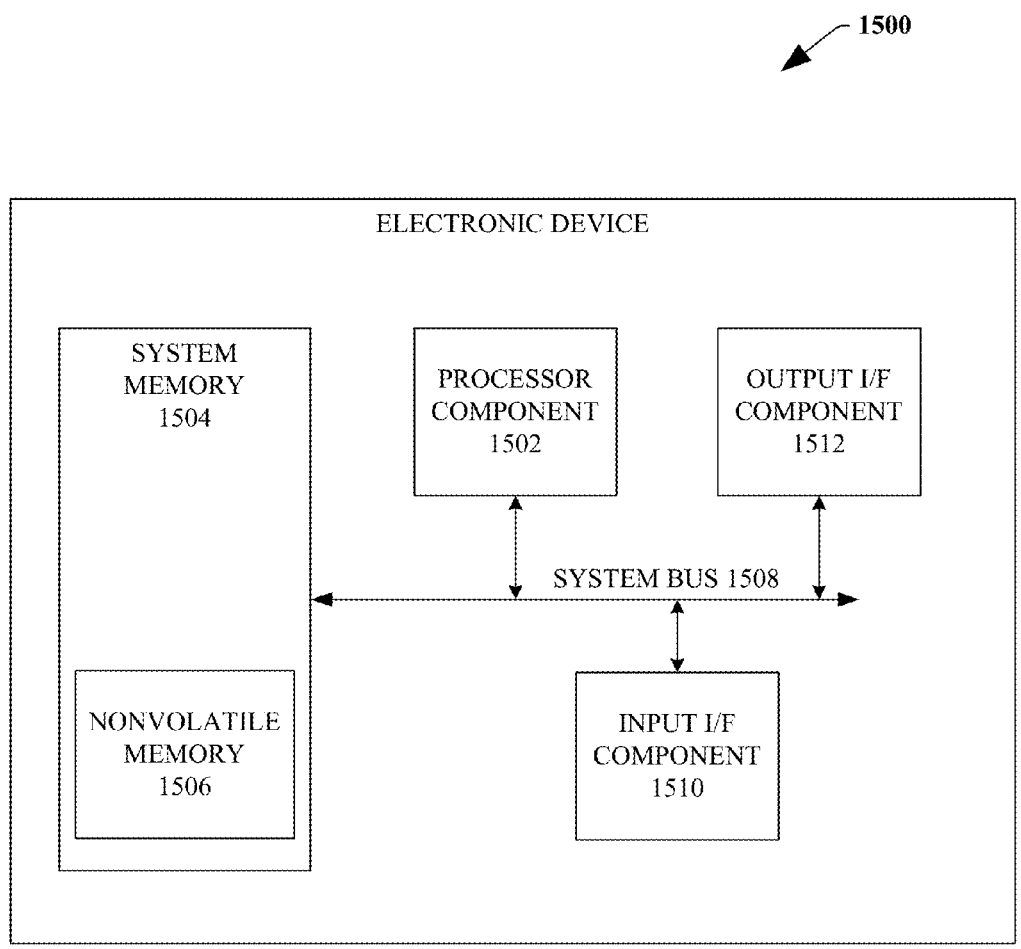
FIG. 15 illustrates a block diagram of an exemplary electronic device that can facilitate panoramic stereo catadioptric imaging in accordance with an aspect of the disclosed subject matter.

Referring to FIG. 15, illustrated is a block diagram of an exemplary, non-limiting electronic device 1500 that can facilitate content transcoding in accordance with an aspect of the disclosed subject matter. The electronic device 1500 can include, but is not limited to, a computer, a server, a laptop computer, a server, a dedicated spatial processing component or device, or network equipment (e.g. routers, access points, femtocells, picocells), and the like.

Components of the electronic device 1500 can include, but are not limited to, a processor component 1502, a system memory 1504 (with nonvolatile memory 1506), and a system bus 1508 that can couple various system components including the system memory 1504 to the processor component 1502. The system bus 1508 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1504 can include computer-readable storage media in the form of volatile and/or nonvolatile memory 1506. A basic input/output system (BIOS), containing the basic routines that help to transfer information between elements within electronic device 1500, such as during start-up, can be stored in memory 1504. Memory 1504 can typically contain data and/or program modules that can be immediately accessible to and/or presently be operated on by processor component 1502. By way of example, and not limitation, system memory 1504 can also include an operating system, application programs, other program modules, and program data. As a further example, system memory can include program modules for subchannel assignment and allocation of power as disclosed hereinabove. In some embodiments memory 1504 can store models, parametric information, or results pertaining to panoramic stereo catadioptric imaging. As an example, a panoramic stereo catadioptric imaging system geometry can be stored in memory 1504. Continuing the example, processor 1502 can process the stored system geometry and store a resulting set of parametric panoramic stereo catadioptric imaging model values in memory 1504. These exemplary values can be employed in determining 3D spatial information for scene points in accordance with the presently disclosed subject matter.

The nonvolatile memory 1506 can be removable or non-removable. For example, the nonvolatile memory 1506 can be in the form of a removable memory card or a USB flash drive. In accordance with one aspect, the nonvolatile memory 1506 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1500 through input devices (not illustrated) such as a keypad, microphone, tablet or touch screen although other input devices can also be utilized. These and other input devices can be connected to the processor component 1502 through input interface component 1510 that can be connected to the system bus 1508. Other interface and bus structures, such as a parallel port, game port or a universal serial bus (USB) can also be utilized. A graphics subsystem (not illustrated) can also be connected to the system bus 1508. A display device (not illustrated) can be also connected to the system bus 1508 via an interface, such as output interface component 1512, which can in turn communicate with video memory. In addition to a display, the electronic device 1500 can also include other peripheral output devices such as speakers (not illustrated), which can be connected through output interface component 1512. In an aspect, other electronic devices, e.g., terminal devices can be communicatively coupled to electronic device 1500 by way of input interface component 1510 and output interface component 1512, which can serve to facilitate transfer of transcoded content streams.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim. Moreover, the term "or" is intended to be an "inclusive or" and not an "exclusive or", unless otherwise indicated.

What is claimed is:

1. A system, comprising:
    a sensor component that detects energy that impinges on the sensor component, wherein a vertical field-of-view for stereo vision is centered near a horizontal plane of the vertical field-of-view;
    a spatial processor component that determines spatial information relating to the energy detected by the sensor component;
    a refractive element component that refracts a first part of the energy associated with a point of a scene to impinge on the sensor component; and
    a reflective element component that reflects a second part of the energy associated with the point of the scene to impinge on the sensor component, wherein the second part of the energy is different from the first part of the energy.

2. The system of claim 1, wherein the energy is at least in part visual spectrum energy.

3. The system of claim 1, wherein the spatial information includes three-dimensional spatial information.

4. The system of claim 1, wherein reflective element component reflects at least part of the energy through the refractive element component to impinge on the sensor component.

5. The system of claim 1, wherein the sensor component comprises a digital camera or digital video camera.

6. The system of claim 1, wherein the refractive element is a wide-angle lens or a fisheye lens.

7. The system of claim 1, wherein reflective element is a radially symmetric convex mirror.

8. The system of claim 7, wherein reflective element is conical, spherical, elliptical, parabolic, or hyperbolic.

9. The system of claim 1, wherein the sensor component, the refractive element component, and the reflective element component are coaxially oriented.

10. The system of claim 1, wherein the energy impinging on the sensor component comprises a panoramic stereo image.

11. The system of claim 10, wherein spatial information captured from the panoramic stereo image includes three-dimensional panoramic spatial information comprising a vertical stereo field of view of at least 20-degrees.

12. The system of claim 1, wherein the spatial processor component employs a model comprising at least a design parameter or a performance parameter.

13. The system of claim 12, wherein the at least a design parameter includes a distance between the refractive element component and the reflective element component, a refractive parameter of the refractive component, or a reflective parameter of the reflective component.

14. The system of claim 12, wherein at least the performance parameter includes an entire vertical field of view parameter, a stereo vertical field of view parameter, an image spatial resolution parameter, a baseline length parameter, or an equivalent baseline length parameter.

15. A method, comprising:
    receiving a set of imaged scene information related to an image of a scene, the image of the scene comprising at least a portion of a field of view of a refractive element and a portion of a field of view of a reflective element;
    determining a first set of image information for a point of the scene, the first set of image information being related to the field of view of the refractive element;
    determining a second set of image information for the point of the scene, the second set of image information being related to the field of view of the reflective element; and
    determining 3-dimensional spatial information for the point of the scene based on the first set of image information and the second set of image information.

16. The method of claim 15, wherein the determining the 3-dimensional spatial information is a function of, at least in part, a parametric model of a system that generated the received first set of information.

17. The method of claim 16, wherein the determining the 3-dimensional spatial information is a function of, at least in part, a parametric model that includes a parameter for a refractive element and parameters for a rotationally symmetric reflective convex element, the refractive element and the reflective element being coaxially oriented in the parametric model.

18. The method of claim 17, wherein the determining a first set of image information includes determining a refractive field of view, the determining a second set of image information includes determining a reflective field of view, and the determining 3-dimensional spatial information includes determining an overlapping vertical field of view based on the refractive field of view and the reflective field of view.

19. The method of claim 16, wherein the determining 3-dimensional spatial information relies, at least in part, on a parametric model,
    the parametric model parameterizing a design parameter that includes:
        a distance between a refractive element and a reflective element a,
        a refractive parameter of the refractive component, or
        a reflective parameter of the reflective component, or
    the parametric model parameterizing a performance parameter that includes:
        an entire vertical field of view parameter,
        a stereo vertical field of view parameter,
        an image spatial resolution parameter,
        a baseline length parameter, or
        an equivalent baseline length parameter.

20. The method of claim 15, wherein the determining 3-dimensional spatial information further comprises calibrating a parametric model of a system with homography.

21. The method of claim 20, wherein the calibrating the parametric model includes employing a known image in a plurality of scene poses.

22. The method of claim 20, wherein the determining 3-dimensional spatial information includes employing at least a first set of viewing cone models to describe image formation geometry of a dioptric image and at least a second set of viewing cone models to describe image formation geometry of a catadioptric image.

23. A non-transitory computer-readable storage medium having computer-executable instructions that, in response to execution, cause a computing device including a processor to perform operations, comprising:
- receiving a scene image information comprising refractive element image information and reflective element image information of a scene;
- determining a first set of image information, for a point of the scene, related to the refractive element image information;
- determining a second set of image information, for the point of the scene, related to the reflective element image information; and
- determining 3-dimensional spatial information for the point of the scene based on the first set of image information and the second set of image information.

24. A system, comprising:
- means for detecting energy impinging on a plane, wherein a vertical field-of-view for stereo vision is centered near a horizontal plane of the vertical field-of-view;
- means for determining 3-dimensional spatial information relating to the energy detected by the means for detecting energy;
- means for refracting at least some of the energy to impinge on the means for detecting energy; and
- means for reflecting at least some of the energy to impinge on the means for detecting energy.

* * * * *